United States Patent [19]

Tonali et al.

[11] 4,216,269

[45] Aug. 5, 1980

[54] POLYVINYLBUTYRATE SHEET STAINING PROCESS FOR THE MANUFACTURE OF LAMINATED AND BULLETPROOF GLASS AS WELL AS PRODUCT OBTAINED BY SAID PROCESS

[75] Inventors: Roberto Tonali, Milan, Italy; Raffaello Bertolini, Via dell'Atleta, Este (Padova), Italy

[73] Assignee: Raffaello Bertolini, Este, Italy

[21] Appl. No.: 930,450

[22] Filed: Aug. 2, 1978

[30] Foreign Application Priority Data

Aug. 3, 1977 [IT] Italy .............................. 26451 A/77

[51] Int. Cl.² ........................ B05D 5/06; B05D 5/00; B05D 3/00; B05D 1/18

[52] U.S. Cl. ................................. 428/500; 427/163; 427/164; 427/257; 427/275; 427/284; 427/353; 427/430.1

[58] Field of Search ........... 427/284, 352, 353, 430 R, 427/385 B, 164, 163, 257, 275; 428/500

[56] References Cited

U.S. PATENT DOCUMENTS

| 2,739,080 | 3/1956 | Woodworth | 427/164 X |
| 3,973,058 | 8/1976 | Grover | 427/163 |

Primary Examiner—Michael R. Lusignan
Attorney, Agent, or Firm—Fleit & Jacobson

[57] ABSTRACT

This invention provides a process for applying a stain on a sheet of polyvinylbutyrate comprising contacting specific zones of the sheet of polyvinylbutyrate with a bath comprising water and a synthetic, organic stain; removing the sheet from the bath after a suitable time of contact; and washing the sheet thoroughly.

14 Claims, 3 Drawing Figures

POLYVINYLBUTYRATE SHEET STAINING PROCESS FOR THE MANUFACTURE OF LAMINATED AND BULLETPROOF GLASS AS WELL AS PRODUCT OBTAINED BY SAID PROCESS

BACKGROUND OF THE INVENTION

The invention concerns a process for the staining of polyvinylbutyrate in sheet form which later is used as a welding compound in the manufacture of laminated and bulletproof glass panes.

Until now, the polyvinylbutyrate has been manufactured and sold in the form of rolls in a transparent, stained or only in one uniform transparent color, with a gradating stripe of uniform shading of coloring, which was used, for example, for automobile windshields. There was also an opaque, white type.

In order to obtain all these variants, the polyvinylbutyrate was stained before it took its lamellar shape, in which case a pigment or stain was added to the paste, which, if necessary, could be added only at one end of the sheet resulting in the formation of a blurring stripe.

Until then, it had not been possible to obtain any kind of coloring after completed manufacture of the sheet in polyvinylbutyrate. Especially, it had never been possible to produce any type of pictorial representation or differentiated coloring on the basis of one or several colors, particularly a coloring with a marble or an alabaster effect, especially because the polyvinylbutyrate could not absorb any color without losing its basic characteristics which consist of welding the glass panes together.

The object of the invention is to obtain at least one staining, that is as differentiated as possible, on polyvinylbutyrate in sheet form, with one or several shades and according to drawings showing marble, alabaster etc.; i.e., to obtain a staining that represents imaginative drawings.

SUMMARY OF THE INVENTION

The above-mentioned aims were achieved by applying to the sheet of polyvinylbutyrate, especially in certain areas of the sheet, a watery solution of an organic, synthetic contaminating stain and that, during a more or less long period of time, it is kept in contact with the stain, according to the desired shade, after which the sheet of polyvinylbutyrate is washed.

BRIEF DESCRIPTION OF THE INVENTION

In particular, a stain called "Arcofen" was used, as manufactured by the Beghe Co. in Milan.

According to one embodiment of the invention, the contact between the sheet of polyvinylbutyrate and the watery solution takes place by means of a preferably very irregular wrinkling of the sheet consisting of polyvinylbutyrate and by immersion of the most extreme part of this wrinking.

Means are provided, such as supports, a vacuum or other means, for example, clamps, for holding the sheet that is as unevenly wrinkled as possible, over a bath containing the stain.

The invention also proposes that the contact of the watery solution with certain areas of the sheet of polyvinylbutyrate take place by means of a structure of an oxidizing material, for example, iron, wherein the structure is developed so that the surface coming in contact with the sheet represents a certain drawing. A first embodiment of this type provides for only partly immersing said structure made of an oxidizing material into the bath containing the stain and for placing the sheet of polyvinylbutyrate on the upper part of said structure, whereby it takes a different stain in those areas that are in contact with said structure. The structure made of said oxidizing material in this case works as transport element of the stain solution. Another embodiment of the invention provides for completely immersing the structure of oxidizing material into the bath and placing the sheet of polyvinylbutyrate on it; the drawing will in this case seem blurred; i.e., the sheet will take a slight coloring of the base, whereas the color intensity at the contact points with the structure will be stronger. In this case, the structure acts as catalyzer of the staining.

The used quantity of stain corresponds to at least 5% of the weight of the water, but can be increased to 25–30%. With the same duration of immersion, a larger quantity of stain will increase the intensity of the color absorbed by the sheet of polyvinylbutyrate.

The coloring intensity generally depends on the intensity of the stain added to the bath as well as on the duration of the immersion. In addition, it must be noted that the process described herein can be used for the coloring of a transparent and opaque sheet of polyvinylbutyrate or, when necessary, also of a sheet with an already applied basic color.

Said process according to the invention can be repeated in different ways: After the completed bath and washing of the sheet of polyvinylbutyrate, another bath of the same or a different color may be used or a bath with a shade that is different than the previous one.

BRIEF DESCRIPTION OF THE DRAWINGS

Embodiments of the invention will be discussed in the following on the basis of the enclosed diagrams. In the diagrams

DETAILED DESCRIPTION OF THE INVENTION

Figure 1:
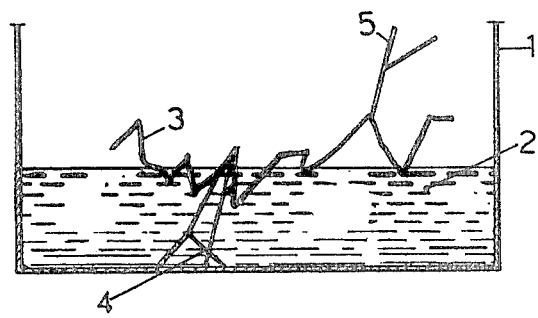
FIG. 1 shows the cross-section of a container having a sheet of polyvinylbutyrate.

In reference to FIG. 1, it can be seen that a bath 2 consisting of water and an organic-synthetic stain corresponding to a minimum part in weight of 5% is contained in a tray 1, wherein subsequently a sheet 3 of polyvinylbutyrate is immersed in the above-mentioned bath, as shown in FIG. 1, the sheet having a very unevenly wrinkled shape. Also provided is the use of supports shown in FIG. 1 and marked with 4, with clamps shown diagrammatically and marked 5, or other, similar devices which can contribute to produce very uneven wrinklings and maintain them. These mentioned devices 4 or 5 may be replaced by other equivalent material having the same task.

Subsequent to a certain duration of immersion on which the intensity of the stain penetrated into the sheet of polyvinylbutyrate will depend, one will remove the sheet 3 from the bath 2 and carefully rinse it off with water, in which case subsequently another immersion process into another stain or another tray with a different intensity or shade, or also in the same tray but with different wrinklings may take place in order to, in this manner, obtain a design that copies shapes, such as onyx, alabaster, marble, etc. By means of the mentioned successive immersions, transparent, semitransparent, opaque and areas with more or less strong intensity may be obtained. In particular, pictures may be superimposed, whereby, in addition, three-dimensional representations and pictures are obtained that correspond to the configuration of the fibers of tree roots with the corresponding knots, twists and colors.

Figure 2:
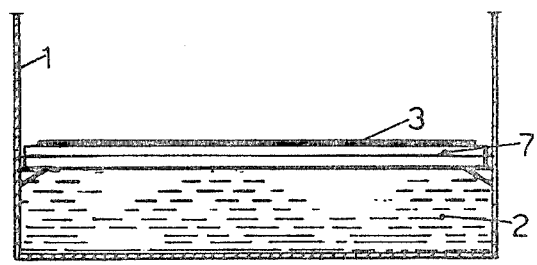
FIG. 2 shows a cross-section along the line II—II of FIG. 3. The latter is essentially the same as the previously mentioned one, wherein, however, a structure of iron is also provided representing a specific drawing.

A second embodiment of said process is obtained by inserting between the sheet of polyvinylbutyrate and the bath an oxidizable structure, in particular made of iron, which acts as transport and catalyzer and also has the task of making the stain penetrate into the polyvinylbutyrate. In particular, FIGS. 2 and 3 show the tray 1, as well as the bath 2 according to the above-mentioned composition, the sheet 3 of polyvinylbutyrate and the structure of iron 7 which, in the present embodiment, is partly immersed into the bath, whereas its upper part that is located outside the bath leads the stain to several reference points or areas of the sheet of polyvinylbutyrate, wherein the latter sheet only receives the stain over the above-mentioned iron structure.

In this latter case, the design will have clear outlines, while the zones or areas of the sheet of polyvinylbutyrate, which are enclosed between two parts 7a of the drawing, appear in their basic color.

It is clear that in this case there is also the possibility, after the butyrate was rinsed off, to proceed to another bath which produces blurring or clear stains.

Figure 3:
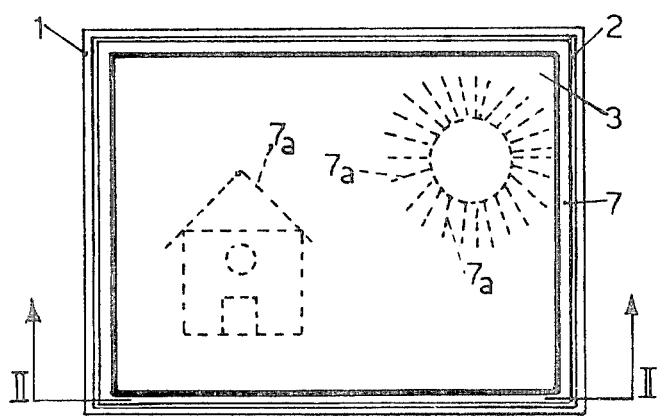
FIG. 3 shows a plan view of the tray shown in FIG. 2.

It must be noted that the structure shown by a dotted line in FIG. 3 is the structure protruding from the bath 2, where all support and connecting means for the various parts 7a of the drawing are provided but not shown. In this case, these support and connecting means must not come in contact with the sheet 3 of polyvinylbutyrate and are therefore, in the lower part of the above-mentioned structure 7 of the metal.

There is also the possibility to insert the structure 7 in such a way that it is completely immersed in the bath, whereby subsequently, the sheet 3 of polyvinylbutyrate is resting on it. In the latter case, the drawing will be blurred, i.e., the areas or zones that are in contact with the structure will have a more intense coloring, while the other zones will take the coloring of the bath, but with less intensity, so that the drawing is only hinted.

This process assures many variants, the abundance of these variants depending on the artistic creative power of the person handling the bath.

The sheet of polyvinylbutyrate that is colored in this manner always has all characteristics of the original product, while it can also not be decolorized through the effect of any means, whether it be washing off or other means.

In this case, the sheet of polyvinylbutyrate is completely impregnated by the stain. The sheet of polyvinylbutyrate can now be placed as an adhesive between two layers of glass in order to, in this manner, produce a layer on bulletproof glass. These processes will then take place as is customary in the manufacture of these types of glass, especially since the sheet of polyvinylbutyrate treated in this manner has not lost the characteristics of the original sheet. The glass produced in this manner will have the same coloring as the sheet of polyvinylbutyrate treated by one of the above-mentioned processes.

What is claimed is:

1. A process for applying a stain on a sheet of polyvinylbutyrate comprising: preparing a bath comprising water and a synthetic organic stain; wrinkling the sheet and contacting the wrinkled portions of the sheet of polyvinylbutyrate with the bath; removing the sheet from the bath after a certain duration of contact; and then washing the sheet thoroughly.

2. The process according to claim 1 wherein the percentage of the stain is in the range of 5% to 25-30% of the weight of the water.

3. The process of claim 1 or 2, wherein the sheet of polyvinylbutyrate is placed on the upper and unimmersed part of a structure of oxidizing material, the structure being in partial contact with the bath.

4. The process according to claim 1 or 3 wherein the work cycle is repeated several times.

5. The process according to claim 1 or 2, wherein the intensity of the desired color is determined as a function of the stain added to the bath as well as the duration of time during which the bath is brought in contact with the sheet of polyvinylbutyrate.

6. The process of claim 1 or 2, wherein a structure of oxidizing material is completely immersed in the bath and the sheet of polyvinylbutyrate is placed thereon.

7. The process according to claim 3, wherein the structure consists of iron.

8. The process of claim 6, wherein the structure consists of iron.

9. The process according to claim 4, wherein the intensity of the desired color is determined as a function of the stain added to the bath as well as the duration of time during which the bath is brought in contact with the sheet of polyvinylbutyrate.

10. The process of claim 4, wherein the sheet of polyvinylbutyrate is placed on the upper and unimmersed part of a structure of oxidizing material, the structure being in partial contact with the bath.

11. The process of claim 5, wherein the sheet of polyvinylbutyrate is placed on the upper and unimmersed part of a structure of oxidizing material, the structure being in partial contact with the bath.

12. The process of claim 4, wherein a structure of oxidizing material is completely immersed in the bath and the sheet of polyvinylbutyrate is placed thereon.

13. The process of claim 5, wherein a structure of oxidizing material is completely immersed in the bath and the sheet of polyvinylbutyrate is placed thereon.

14. Layered or bulletproof glass, which comprises a sheet of polyvinylbutyrate that was treated according to one of claims 1, 3, 7 and 8.

* * * * *